March 25, 1930.  L. M. PERSONS  1,752,106
FLEXIBLE COUPLING
Filed Dec. 19, 1927  3 Sheets-Sheet 1
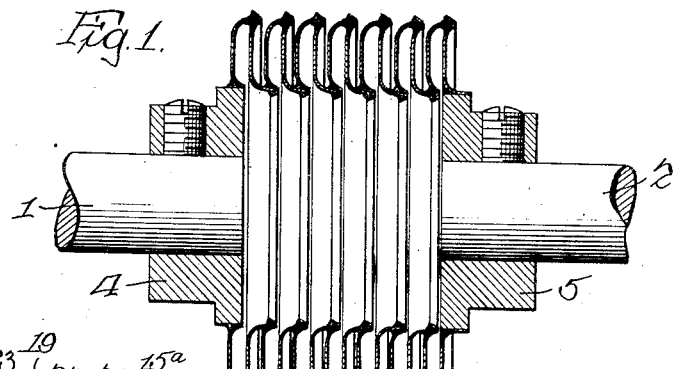
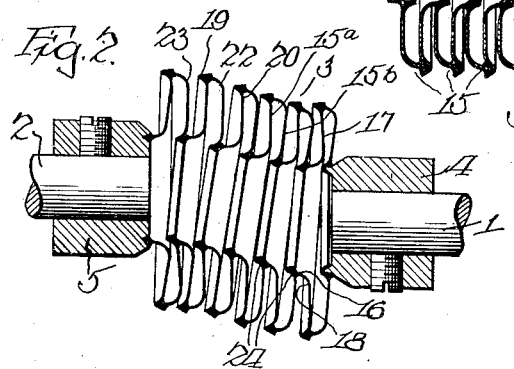
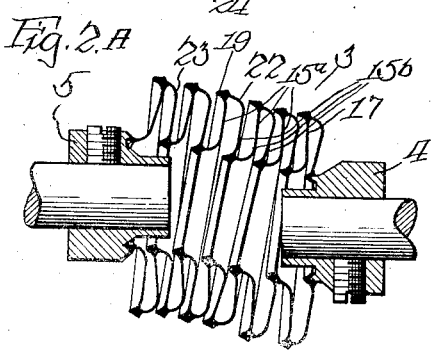
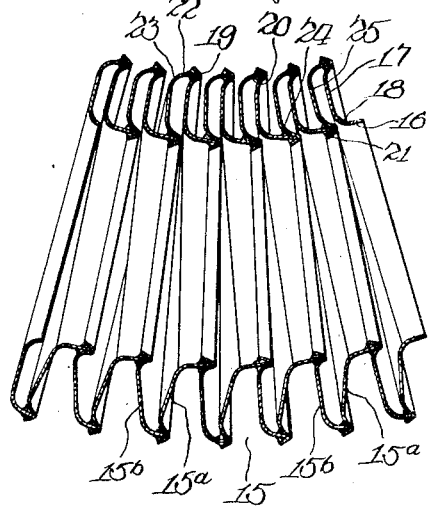
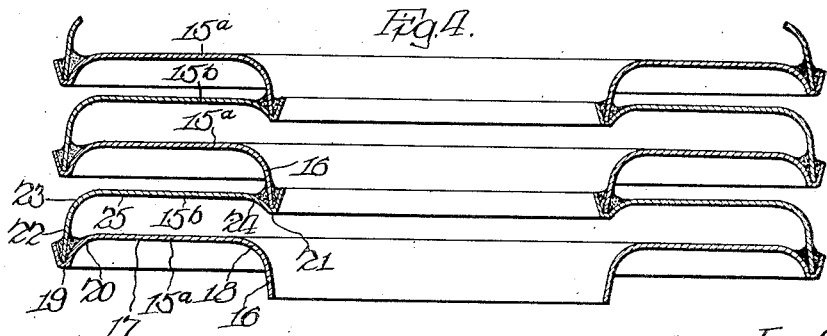
Inventor:
Lawrence M. Persons.
By Jones, Addington, Ames & Siebold
Attys.

March 25, 1930.  L. M. PERSONS  1,752,106
FLEXIBLE COUPLING
Filed Dec. 19, 1927   3 Sheets-Sheet 2

Inventor:
Lawrence M. Persons
By Jones, Addington, Ames & Seibold
Attys.

March 25, 1930.　　L. M. PERSONS　　1,752,106
FLEXIBLE COUPLING
Filed Dec. 19, 1927　　3 Sheets-Sheet 3

Inventor:
Laurence M. Persons
By Jones, Addington, Ames & Seibold
Attys.

Patented Mar. 25, 1930

1,752,106

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

FLEXIBLE COUPLING

Application filed December 19, 1927. Serial No. 240,963.

This invention relates to universal joints or flexible couplings and is particularly adapted for use in drive shafts, although it is not limited to such use. It embodies a construction in which there are no moving surfaces in contact to cause friction and wear. It furthermore not only permits the requisite movements out of line by the connected parts of the shaft as is necessary in universal joints or flexible couplings, but also permits a certain amount of relative longitudinal movement between the connected parts of the shaft. This makes the device particularly useful on drive shafts for heavy duty work where there are constant longitudinal strains as well as lateral strains, and where it is desirable to avoid grinding or noise in operation. It embodies a construction in which the bending strains and the power transmitting strains are thoroughly and properly distributed to all parts of the device whereby each part or portion takes care of its part of the strain, and there is no undue localization of strain, at any time, or on any part, causing deterioration.

The invention is capable of embodiment in very simple and compact form at small expense and may be easily assembled and applied in use. The construction is furthermore adapted to be made and sold as an attachment which can be easily applied, for instance, in any transmission with very slight change in the construction of the transmission mechanism.

It is well known that relative movement between parts of a joint or coupling has a tendency to generate heat. This is particularly true with a type of joint in which no metal is employed, and the driving forces are transmitted from one member to another through non-metallic devices. The result, in the case of a non-metallic joint, is that constant flexion of the material itself generates heat, and the tendency is toward excessive wear and deterioration of the material. Whether constructed of metallic or non-metallic material, the parts constituting the universal joint or flexible coupling are usually assembled by bolts which provide alternately spaced point connections between adjacent sections. Localized strains are inherent in a construction of this type. The device is soon torn apart at the point connections and its life is relatively short.

The present invention is particularly concerned with the provision of a practical form of flexible coupling or universal joint wherein the parts are united in a manner preventing destruction or weakening of the material at the unions, and wherein the deflection of the parts are confined to portions which prevent localizing of any bending strain at the unions.

In order to apprise those skilled in the art how to construct and practice my invention, I shall now describe a preferred embodiment thereof in connection with the accompanying drawing which forms a part hereof.

In the drawing:

Figure 1 is a longitudinal sectional view of a universal joint or flexible coupling embodying my invention;

Fig. 2 is an elevational view illustrating the manner in which the device permits angular movement between the drive shaft and the driven shaft;

Fig. 2A is a similar view;

Fig. 3 is an enlarged sectional view of the coupling;

Fig. 4 is an enlarged detail view of several of the members forming the coupling to illustrate the manner in which they are connected together;

Figure 5:
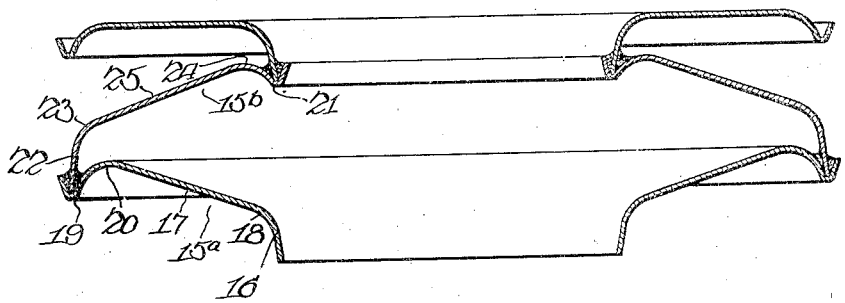
Fig. 5 is a similar view but illustrating the manner in which these parts may be extended or flexed without imposing the bending strain on the union.

In the accompanying drawings, the transmission comprises a drive shaft 1, a driven shaft 2 and a universal joint or flexible coupling 3. Device 3 not only acts in one sense as a universal joint but also as a flexible coupling. It is constructed to absorb vibration so that vibration cannot be transmitted between shafts.

Both shafts may be connected to device 3 in any suitable manner. As illustrated, bearings 4 and 5 are provided to receive the ends of these shafts. More specifically, the flexible coupling comprises a plurality of flexible metallic plates 15 formed in a manner permitting circumferential edge engagements between the plates, the inner and outer peripheries of these plates affording a peripheral union with the peripheries of opposite adjacent plates whereby to provide a continuous collapsible and expansible wall. Such collapsible and expansible wall acts in this instance as a very efficient universal joint or flexible coupling whereby any bending strains produced either by longitudinal or lateral flexion are readily absorbed and are not transmitted to the peripheral unions between plates. A circumferential edge engagement of the plates also affords a stronger flexible connection for the purpose of transmitting torque between the drive shaft and the driven shaft, thereby allowing the adaptation of my device to heavy duty work as well as to light transmission work.

As noted more particularly in Figs. 3, 4 and 5, plate 15$^a$ has a substantially large flange 16 joined with the intermediate flat portion 17 by the curved portion 18. Plate 15$^a$ is also provided with a slightly smaller flange, which terminates into a gutter 19. Gutter 19 unites with flat portion 17 by a curved portion 20. Part 15$^b$ is substantially the same as part 15$^a$ with the exception that it is reversed in the arrangement of its flange and gutter. It has an inner peripheral gutter 21 and an outer peripheral flange 22. Flange 22 is substantially the same as flange 16 and is adapted to be inserted in gutter 19. Likewise, the gutter 21 is adapted to receive a similar flange on the next succeeding plate, as illustrated in Fig. 4. In the assembly of these plates, solder is allowed to flow freely about the gutters whereby to assure a solid solder joint securing the flanges in the gutters. It will be observed that the capillary action of the solder causes the solder to flow upwardly along the walls of the plates. The free flowing of this solder in the gutters also assures that no air bubbles or voids are allowed to form in the solder, thereby obtaining a substantially solid union about the entire periphery of each connection.

Flange 22 is also joined to plate 15$^b$ by a curved portion 23. Gutter 21 is joined to plate 15 by a curved portion 24. The formation of plates 15$^a$ and 15$^b$ causes the deflection to be confined to the flat portions 17 and 25 of these plates, this being accomplished by the curved portions 18, 20, 23 and 24, which prevent any bending strains from being transmitted to the flange and gutter connections. The formation of each plate tends to limit the bending movements about its curved portions so as not to permit the imposition of strain on the soldered connections. There is, therefore, no tendency to crystallize or deteriorate the metal at these joints, and I have found by experiments that these joints have an exceedingly long life. Furthermore, the experiments which have been conducted prove that a joint of this type is very efficient in transmitting rotative movement. This allows a unique adaptation of device 13 to universal joints or flexible couplings.

I have illustrated in Figs. 2 and 2A the shape which device 3 will assume in the event the drive shaft and driven shaft are out of alignment. The deformation assumed by device 3 will in no instance cause the bending strain to become localized at the soldered connections of plates 15. This bending strain is confined to the flat portions 17 and 25. It is, therefore, impossible for the soldered union or peripheral edge engagements to break away. The position of the plates 15 in these figures illustrates the manner in which the deflection is confined to the flat portions and the bending limited to the curve portions 18, 20, 23 and 24 to prevent any strain upon the joint. Greater flexibility and strength are accordingly obtained.

Figure 6:
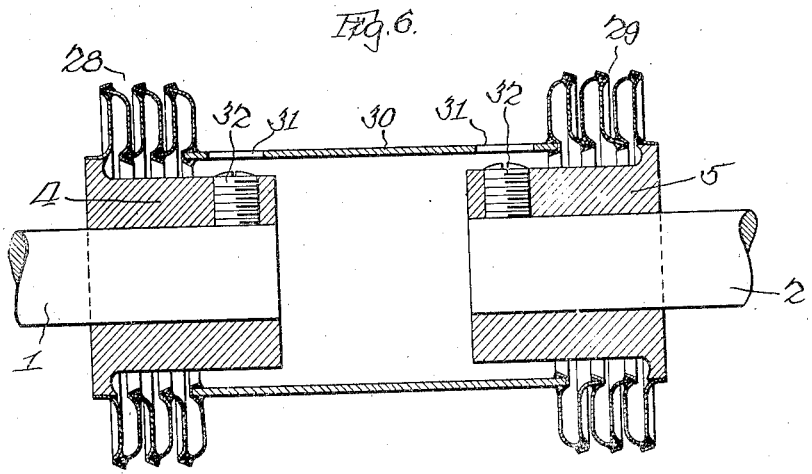
Fig. 6 is a view partly in section and partly in elevation of my improved device, this view illustrating the manner in which the parts may be supported and joined by an interconnecting member in order to secure greater flexibility between the drive shaft and driven shaft.

I have illustrated in Fig. 6 a universal joint or flexible coupling having two flexible units 28 and 29, each unit being equivalent to device 3, as shown in Fig. 1. A rigid sleeve 30 interconnects these units 28 and 29. This arrangement allows greater angular flexibility of the device as a whole and at the same time obtains relatively greater compactness. The bearings 4 and 5 are extended inwardly and the sleeve 30 is provided with openings 31 to permit the insertion of a tool for operation of the set screws 32, which are employed to hold the shafts 1 and 2 engaged.

Figure 7:
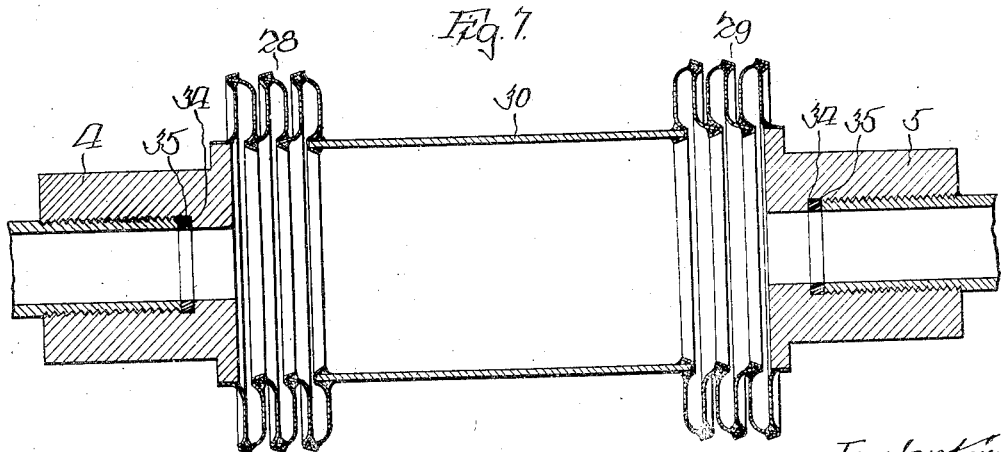
Fig. 7 is a view illustrating the manner in which the device may be used as a flexible coupling in a fluid line.

In Fig. 7 I have illustrated a device somewhat similar to Fig. 6. This alternative embodiment is particularly adapted as a flexible connection in a fluid line, such as a water connection on motor vehicles. Each shaft enters its bearing and seats against packing 35 interposed between the shaft and an abutment 34. On the other hand, this embodiment may be inserted in a stationary fluid line and employed in lieu of the usual U-shaped expansion connections, which are used particularly in heating systems where the high temperatures of the heating fluid cause expansion of the piping and where provisions must be made for such expansion.

Figure 8:
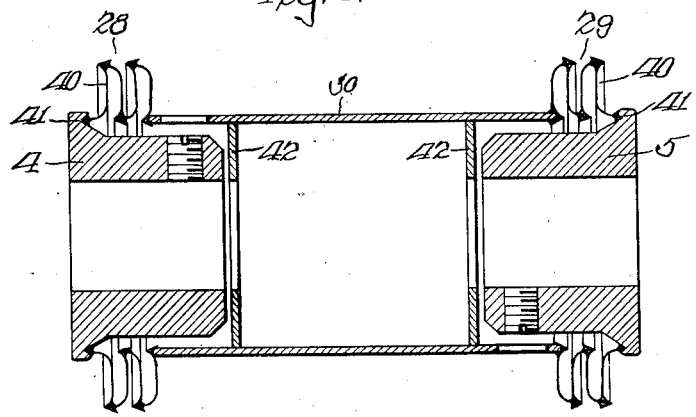
Fig. 8 is a view similar to Fig. 6.
Figure 9:
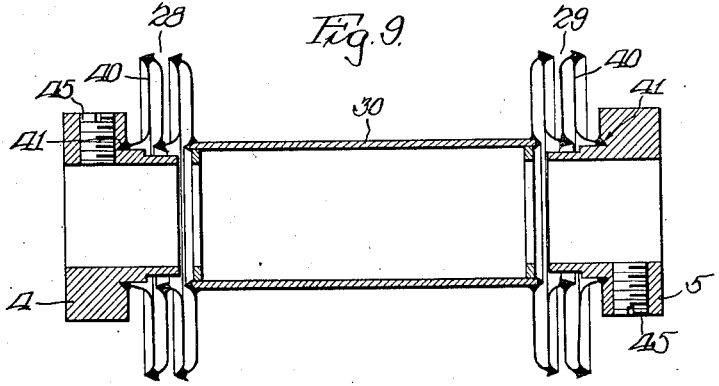
Fig. 9 is a view of a similar device illustrating an exterior attachment for the connecting shafts.

In Figs. 8 and 9, similar embodiments of the invention are shown. The outer plate 40 of units 28 and 29 may be seated in a soldered gutter 41 cut in the bearings 4 and 5. These bearings may extend inwardly in sleeve 30. If so desired, apertured plates 42 may be disposed in sleeve 30, as illustrated in these figures. The structure shown in Fig. 9 may be used where the bearings 4 and 5 may extend outwardly so as to permit the use of exterior fastening means, such as screws 45, and where, if so desired, a fluid may be conducted through the coupling, such as in heating and other fluid systems.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a device of the class described, the combination with a drive shaft, of a driven shaft, and a collapsible and expansible unit therebetween comprising metallic plates united peripherally by alternately arranged gutter and flange connections.

2. In a device of the class described, the combination with a drive shaft, of a driven shaft, and a collapsible and expansible resilient unit therebetween comprising metallic plates united peripherally by alternately arranged soldered filled gutters and cooperating flanges, each plate being formed to prevent deflection at its periphery.

In witness whereof, I have hereunto subscribed my name.

LAWRENCE M. PERSONS.